Figure 1:
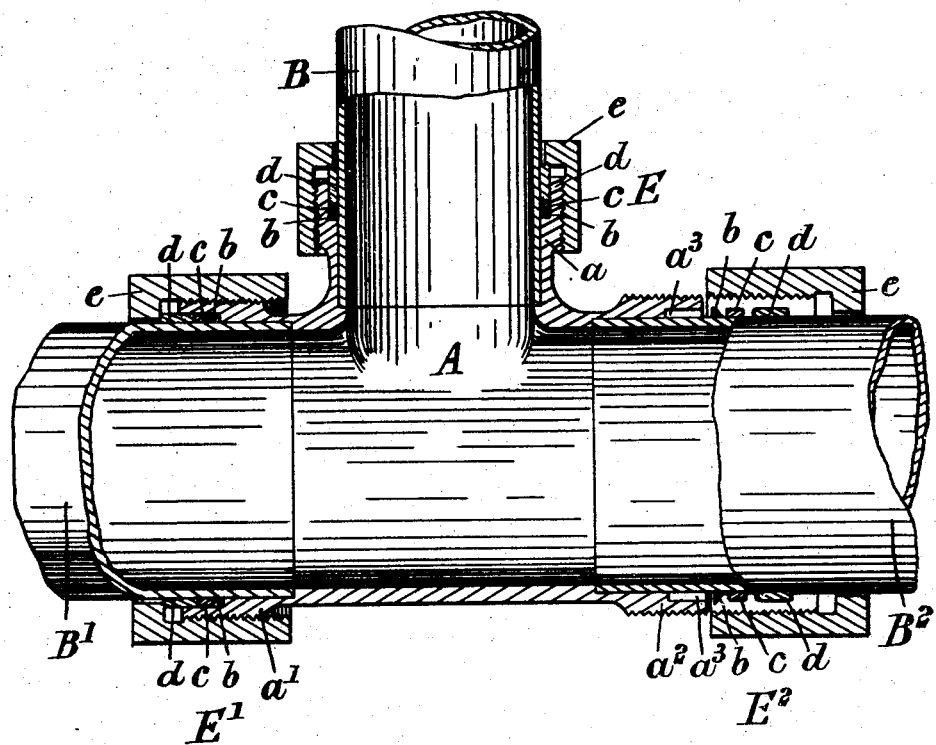

Nov. 11, 1930.    R. H. HELLYER    1,781,581
PIPE JOINT
Filed June 5, 1929

INVENTOR
REGINALD HARVEY HELLYER
by his attorneys
Howson and Howson

Patented Nov. 11, 1930

1,781,581

UNITED STATES PATENT OFFICE

REGINALD HARVEY HELLYER, OF LONDON, ENGLAND

PIPE JOINT

Application filed June 5, 1929, Serial No. 368,618, and in Great Britain September 17, 1928.

This invention relates to the method of effecting a fluid-tight joint between the pipe and the socket of a second pipe, or between a pipe or pipes and the sockets of a valve casing, or other element, (hereinafter referred to as the socket) wherein a packing ring of somewhat harder metal than that of the pipe is pressed into engagement with the outer surface of the said pipe by a nut within which the end of the said pipe and the end of the socket to which it is to be connected is received. In joints of the aforesaid kind it has been proposed to provide a packing ring having a bevelled end or bevelled ends, with which a bevelled portion formed on the nut, or the bevelled portions formed on both the union and the nut engage so that when pressure is applied, by screwing up the nut, or the union, one, or both, of the bevelled ends of the packing ring is, or are, forced into the metal of the pipe to such an extent that a key connection is formed which cannot be separated without rupture of one or both of the connected parts.

This invention has for its object to provide means whereby a fluid-tight joint can be more easily, quickly and efficiently effected and also whereby the connected parts can when desired, be readily disconnected without liability of rupture.

According to this invention I interpose between the outer peripheral surface of a pipe and the inner surface of an annular recess formed in the outer portion of a socket within which the end of the said pipe is to be secured, a fixing ring of harder metal than that of the pipe and a packing ring of soft metal, such for example as lead, the said parts being so adapted and arranged that pressure applied to the outer part of the said packing ring will cause an edge, or inner part, of the said fixing ring to grip, or bite into, the pipe so as to prevent longitudinal movement of the said pipe relatively to the said socket and will cause the packing ring to spread, or flow, between the parts in such a manner as to effect a fluid-tight joint between the said pipe and the said socket. Pressure may be applied by screwing a suitably shaped nut, through which the pipe is passed, on to an externally screwthreaded part of the socket or by any other suitable means. The nut may be adapted to bear directly on the packing ring but preferably a gland ring is interposed between the said packing ring and an inwardly projecting flange on the outer end of the said nut.

The fixing ring is preferably made from a ring of rectangular, or approximately rectangular, shape in cross section, which is subsequently stamped, or pressed, in such manner that its sides are inclined to the axis of the ring, so that when placed in position on the pipe only one of its edges bears upon the said pipe and there is a tendency when pressure is applied, for the said ring to be pressed into its original form and thereby grips, or bits into, the pipe and holds it against longitudinal movement as aforesaid.

The inner portion of the socket is preferably bored to receive the end of the pipe with a sliding fit and is formed with a shoulder, or seating, upon which the end of the said pipe abuts.

Figure 2:
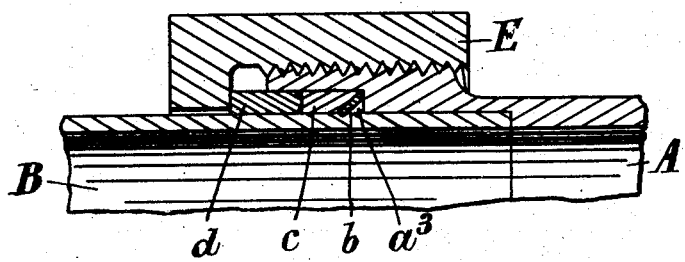

The accompanying drawing illustrates in section in Figure 1, by way of example, three pipes connected, in accordance with this invention, to a T-shaped junction piece. Figure 2 is a fragmentary section showing parts drawn to a larger scale than in Figure 1.

Referring more particularly to Figure 1, A indicates the T-shaped junction piece having internally shouldered sockets $a$, $a^1$ and $a^2$ into which are inserted the ends of pipes B, $B^1$ and $B^2$ respectively. Formed in the outer end portions of each of the sockets $a$, $a^1$ and $a^2$ is an annular recess $a^3$ for the reception of a fixing ring $b$ of harder metal than that of the pipe, a packing ring $c$ of soft metal, such for example as lead and a gland ring $d$. The sides of each of the fixing rings $b$ are inclined to its axis so that when the said ring is placed on a pipe only one of its edges bears thereon so that when pressure is applied on the said ring this edge grips, or bites into, the pipe (as shown more clearly in Figure 2) and prevents longitudinal movement of the said pipe relatively to the socket. Pressure is supplied by nuts E, E¹ and E² screwed onto the externally screw-threaded sockets $a$, $a^1$ and $a^2$ respectively, each of the said nuts having an inwardly projecting flange $e$ which engages with the outer end of its associate gland ring $d$, $d^1$ or $d^2$. Upon screwing up the nuts the respective gland rings $d$ will press the packing rings $c$ into the recesses $a^3$ formed in the sockets $a^2$ in such manner that a fluid-tight joint is effected between the said sockets and the ends of the pipes therein and upon further screwing up of the nuts the fixing rings $b$ will, as aforesaid, be caused to grip, or bite into, the said pipes.

In Figures 1 and 2 the nut E is shown fully screwed up to effect the fluid-tight joint between the pipe B and the socket $a$, and the nut B¹ is shown partially screwed up to the position it occupies immediately before pressing its associate packing ring $c$ into its recess $a^3$ to effect a fluid-tight joint, whilst the nut E² and its associate fixing ring $b$, packing ring $c$ and gland ring $d$ are for the sake of clearness all shown separated on the pipe B².

By connecting the end of a pipe in a socket in the manner hereinbefore described a fluid-tight joint can be easily and quickly effected, and the parts can be easily and quickly disconnected, without rupturing any part, or element, of the joint, by simply removing the nut from its associate socket and pulling the pipe from the said socket as movement of the pipe in this direction will cause the fixing ring to release its grip on the said pipe.

What I claim is:—

An improved joint comprising a pipe, a socket member recessed at the outer end thereof and adapted to fit over the end of said pipe, a fixing ring made of harder metal than said pipe and having its sides inclined to the pipe axis and having one edge bearing against said pipe, a soft metal packing ring, a gland ring abutting said packing ring, all said rings fitting around said pipe within said recess, a nut engaging with the outside of said socket and adapted to press against said gland ring and cause said packing ring to spread and effect a tight joint and to cause the edge of said fixing ring to bite into said pipe to prevent longitudinal movement between the pipe and socket.

In testimony whereof I have signed my name to this specification.

REGINALD HARVEY HELLYER.